United States Patent [19]

Duggan

[11] 4,321,942

[45] Mar. 30, 1982

[54] BACKFLOW PREVENTER VALVE

[76] Inventor: Daniel C. Duggan, 12049 Mereview Dr., Creve Coeur, Mo. 63141

[21] Appl. No.: 138,290

[22] Filed: Apr. 8, 1980

Related U.S. Application Data

[62] Division of Ser. No. 947,778, Oct. 2, 1978, Pat. No. 4,249,568.

[51] Int. Cl.³ .............................................. F16K 24/00
[52] U.S. Cl. .................................... 137/218; 137/107; 137/312; 137/513; 137/516.25; 137/527.8; 137/544; 137/584
[58] Field of Search ............... 137/107, 218, 312, 513, 137/516.25, 516.27, 516.29, 584, 527.8, 544

[56] References Cited

U.S. PATENT DOCUMENTS

| 2,654,388 | 10/1953 | Glass | 137/312 |
| 3,171,423 | 3/1965 | Dillon | 137/218 |
| 3,785,397 | 1/1974 | Young | 137/434 |

Primary Examiner—Gerald A. Michalsky
Attorney, Agent, or Firm—Haverstock, Garrett & Roberts

[57] ABSTRACT

A backflow preventer valve including a housing structure having inlet and outlet ports therethrough for attaching to system conduits, a chamber formed in the housing, a pair of spaced valve seats associated with one of the ports including a space formed between the valve seats, a movable valve assembly including a first member hingedly attached to the valve housing structure for movement in the chamber between a closed position adjacent to the valve seats and an open position angularly related to the closed position, the valve assembly having a clapper portion defined by relatively movable inner and outer members, a flexible valve member including first and second portions and separate members for attaching the flexible valve member respectively to the inner and outer clapper members, the first portion of the flexible valve member being engageable with one of the pair of spaced valve seats in the closed position thereof and the second portion being engageable with the other of the pair of valve seats in the closed position thereof, and a discharge port communicating the space formed in the valve housing structure by and between the pair of spaced valve seats with atmospheric conditions. The subject valve may also optionally include a discharge valve assembly associated with the discharge port to control communication therethrough.

26 Claims, 11 Drawing Figures

BACKFLOW PREVENTER VALVE

This application is a Division of copending application Ser. No. 947,778 filed Oct. 2, 1978, now U.S. Pat. No. 4,249,568.

Backflow preventer valves have been known and used for a considerable time and are intended for use on water and other fluid connections where the possibility of non-toxic contamination from backflow or back siphonage exists, constituting a potential health hazard and/or a nuisance. Such valves are often used in association with overhead sprinkler systems employed for fire safety and are adaptable to any fluid system where it is desired to prevent non-toxic contamination from one portion of the system to another. This is especially true of systems where stagnant water or contaminated liquids may remain in a portion of the system for a considerable period of time and it is desired to prevent the contaminated liquids from flowing back through the valve and into the main fluid source. There are also other uses for backflow preventer valves including in any system where it is desired to prevent flow in one direction but not in the other. Typical applications include: food processing operations, industrial waste processes, water make-up lines on hot water or steam boilers, and irrigation systems.

All of the known backflow preventer valve constructions have been relatively expensive, large in size, heavy, and complicated, many have required more than one assembly, the known systems have been difficult to repair and maintain, and all of the known backflow preventer valves have certain shortcomings including being unable to completely prevent backflow. If a portion of the known devices becomes inoperative, particularly in a valve seat portion, it is possible that contamination can occur and cause irreparable damage. This in part is due to the fact that the known constructions for the most part have had single valve seats or complicated valve seat structures, but none so far as known have had dual valve seats with a space or chamber formed between the dual valve seats that is maintained at ambient pressure by being vented to atmosphere under normal operating conditions by means of an open discharge passage or port located adjacent to the bottom of the valve housing in position such that, when the movable valve assembly is in its closed position, any backflow fluid which becomes trapped or otherwise collects between the dual valve seats and the valve assembly is allowed to drain therethrough to atmosphere to maintain an airspace therebetween. Furthermore, none of the known constructions have had a valve assembly formed by two relatively movable clapper members which are connected together by a flexible valve seat member which permits limited relative movement therebetween without stretching or otherwise deforming the valve seat member and yet forms a seal between members. By so providing, the two separate spaced valve seats of the present device are able to cooperate to provide a dual seating action with a normal draining feature between the valve seats and yet provide a valve which otherwise will permit opening and closing to allow for the passage of fluid in one direction but not in the other. Furthermore, the present construction may include a discharge valve in the means that drain the space between the valve seats, which discharge valve is under control of the position of the main clapper assembly and, when the main clapper assembly opens the discharge valve will close to prevent loss of fluid during those periods when the backflow preventer valve is open.

It is therefore a principal object of the present invention to provide a relatively simple backflow preventer valve which does not need to operate in conjunction with a companion flow preventer valve and yet provides safety from contamination in any fluid system that needs such a valve.

Another object is to provide a backflow preventer valve with two spaced continuous valve seats separated from each other by a space, which space communicates to atmospheric conditions when the valve is closed and provides a drain for said space.

Another object is to prevent backflow through a valve even under conditions where one of the two valve seats therein is leaking for some reason.

Another object is to provide a backflow preventer valve which is relatively simple structurally and is relatively easy to install and maintain.

Another object is to provide a backflow preventer valve which may be installed in its operational mode in the horizontal or vertical position, or at any angle therebetween.

Another object is to provide a backflow preventer valve which is relatively easy to inspect.

Another object is to reduce the cost of systems that require the use of a backflow preventer valve for some reason, such as to prevent contamination of one body of water by another.

Another object is to provide a relatively simple clapper assembly having two relatively movable members with valve seats associated with each.

Another object is to provide a backflow preventer valve which can be made in a large variety of sizes and which requires minimum modification of an existing system.

Another object is to reduce the number of parts in a backflow preventer valve.

Another object is to teach the construction of a backflow preventer valve which provides for the discharge of fluids between valve seats when the valve is closed but not when the valve is opened.

Another object is to provide a two seated backflow preventer valve, whose seats are engageable independently of each other by respective valve means, which will operate properly even when one of the seats is not fully closed.

Another object is to provide a backflow preventer valve which gives an indication when there is leakage past a valve seat associated therewith that should be closed.

These and other objects and advantages of the present invention will become apparent after considering the following detailed specification which discloses several different embodiments of the subject device in conjunction with the accompanying drawings, wherein:

Figure 1:
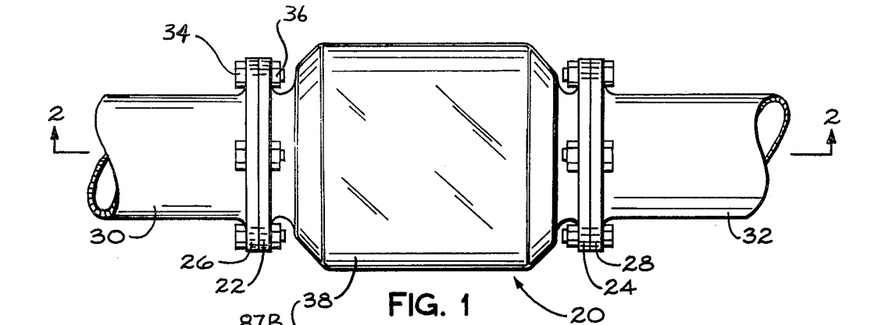
FIG. 1 is a side elevational view of a backflow preventer valve installed in a fluid system and constructed according to the present invention.

Referring to the drawings more particularly by reference numbers, number 20 refers generally to a backflow preventer valve constructed according to the teachings of the present invention. The valve 20 is shown in FIG. 1 having end flanges 22 and 24 which are shown bolted to end flanges 26 and 28 respectively of conduit members 30 and 32. This is done by bolts 34 and nuts 36. Suitable gaskets may also be employed. The backflow preventer valve 20 has a housing structure 38 which is shown as being generally tubular in shape. One side of the housing may be slightly enlarged as clearly shown in FIG. 2 to accommodate a hinged clapper assembly 40 which is shown in solid outline in its closed position and in dotted outline in its opened position. In addition, one side of housing structure 38 also includes an access panel (not shown) through which clapper assembly 40 can be easily accessed for maintenance and service and is of sufficient size and shape such that the entire clapper assembly can be completely removed therethrough.

Figure 2:
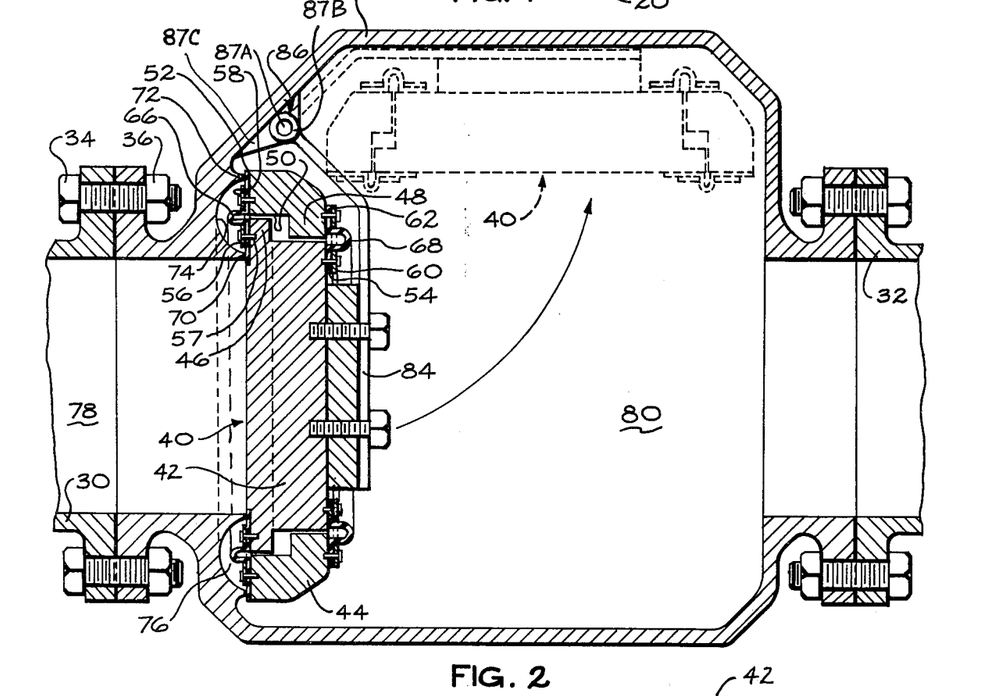
FIG. 2 is a cross-sectional view taken through the center of the backflow preventer valve of FIG. 1, the clapper assembly being shown in solid outline in its closed position and in dotted outline in its open position.
Figure 3:
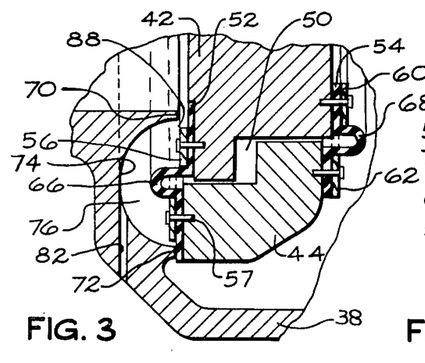
FIG. 3 is an enlarged fragmentary cross-sectional view of the subject valve showing the discharge port and the clapper assembly with the inner clapper member thereof in an open position and the outer clapper member in a closed position.
Figure 4:
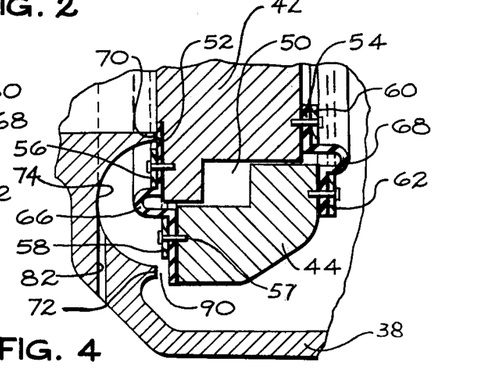
FIG. 4 is an enlarged fragmentary cross-sectional view of the embodiment of FIG. 3 showing the inner clapper member in a closed position and the outer clapper member in an opened position.

Referring again to FIG. 2, the clapper assembly 40 includes two relatively movable clapper members including an inner or primary clapper member 42 and an outer or secondary clappper member 44 which are concentrically located relative to each other. The inner clapper member 42 is shown as being round and has an outwardly extending annular flange 46 which extends therearound. The outer clapper member 44 is annular in shape and has an inwardly extending annular flange 48 and an annular channel 50 which is constructed to receive and accommodate the outwardly extending flange 46 on the inner clapper member 42. Some clearance is provided between the members 42 and 44 to facilitate relative movement therebetween. The clapper members 42 and 44 are sealably connected together by annular flexible gaskets 52 and 54. The gasket 52 is attached to the inner clapper member 42 by means of an annular ring 56 and suitable threaded members such as member 57. The gasket 52 is connected to the outer clapper member 44 by a similar annular flange member 58 and other fastener members suitable to the member 57. In like manner, the annular gasket 54 is connected to the inner clapper portion 42 by an annular member 60 using suitable fasteners, and to the outer clapper portion 44 by means of another rigid annular member 62 and suitable fasteners. It should be noted that the gaskets 52 and 54 have generally U-shaped flexible central portions 66 and 68 respectively by which they are able to bend or flex as shown in FIGS. 3 and 4 to enable one portion of the valve to open or be opened while the other portion is closed and so forth. The purpose of this will become more apparent hereinafter.

The flexible gasket 52, which is the only one that is required, not only serves to seal between the clapper portions 42 and 44 but also serves to cooperate with annular valve seats 70 and 72 formed on housing structure 38. The annular valve seats 70 and 72 are spaced from each other across an annular cavity 74, and when the clapper member is in the closed position as shown in solid outline in FIG. 2, an annular closed space is formed and is identified in FIG. 2 by the number 76.

Referring again to FIG. 2, it can be seen that when the clapper assembly 40 is in the closed position, the annular space 76 is sealed from communication with the fluid upstream from the valve as at 78 by means of the cooperation between the inner or primary annular valve seat 70 and the flexible gasket 52. In like manner in the closed position, the space 76 is sealed from communication with the fluid downstream thereof as at 80 by the cooperation between the valve seat 72 and a different portion of the same annular gasket or seal member 52.

Figure 5:
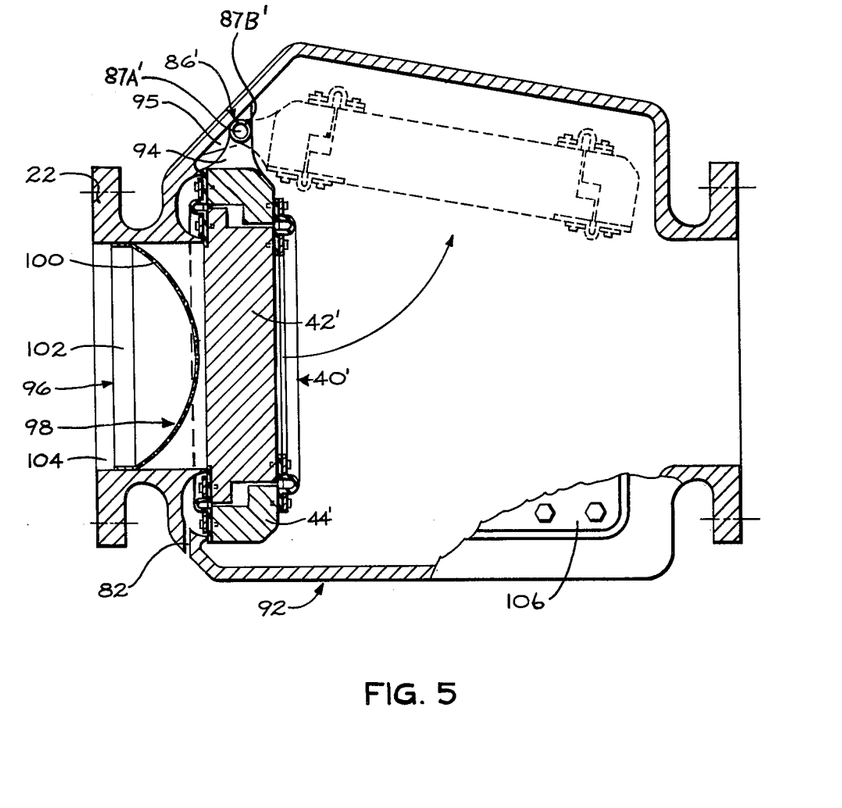
FIG. 5 is a cross-sectional view similar to FIG. 2 but showing a somewhat modified form of the subject backflow preventer valve.

In the form of the valve shown in FIGS. 3, 4, and 5, the space 76 communicates with one end of a discharge or pressure relief orifice 82 which has its opposite end at atmospheric pressure. In order to eliminate the possibility of contaminated fluids being forced backwardly through the valve and into the main fluid source at 78, the space 76, which is formed in the housing structure 38 by the annular cavity 74 between the valve seats 70 and 72 and by the seal member 52 on the clapper assembly 40, is maintained at ambient air pressure when the valve is closed. Ambient pressure results in the space because the space 76 is isolated from the fluids on both opposite sides of clapper assembly 40 and is vented to the outside air through the orifice 82. The orifice 82 will also permit any fluid such as water trapped in the space 76 to drain out therethrough to atmosphere, and the orifice 82 can be connected to a conduit to discharge into a suitable waste water drain. It is therefore preferred that the orifice 82 be located at or near the bottom of the valve but this is not essential to its operation. It should also be apparent that if either or both the upstream or the downstream valve seat 72 or 70 should not be completely in sealed contact with the gasket 52, the space 76 will fill with fluid past the unseated seat and this fluid will drain out through the orifice 82 providing an indication or warning to the user that something is wrong. If no discharge orifice such as the orifice 82 is used as in the valve assembly depicted in FIG. 2, any backflow fluid which becomes trapped in the annular space 76 will accumulate therein but will not be able to escape past the other valve seat unless both seats are leaky. The orifice 82 therefore provides not only a means to drain the space 76 of backflow fluid but, in addition, also provides for a discharge of fluid if for any reason the clapper assembly malfunctions, or opens, in whole or in part.

Referring again to FIG. 2, the inner clapper member 42 is shown connected to an arm member 84 which has its opposite end pivotally attached by pivot means 86 to the housing structure 38. The pivot means 86 are shown as including a pin member 87A that extends through bracket mounting means 87B to pivotally connect the arm member 84 to mounting flange 87C on the structure 38. However, other suitable pivot means may be utilized. The hinged arm member 84 keeps the clapper assembly 40 in the proper alignment particularly as it moves relative to the annular valve seats 70 and 72 and it enables the clapper assembly 40 to move between its closed position as shown in solid outline and its open position shown in dotted outline. If, for some reason, the upstream fluid pressure exceeds the downstream pressure by some predetermined amount that takes into account the relative sizes of the opposite sides of the clapper that are exposed to the pressure differential the inner clapper member 42 will begin to move away from the valve seat 70 and toward the outer clapper member 44. As the differential pressure drop across the clapper increases, the two piece clapper assembly 40 will thereafter move together and be rotated about the pivot means 86 toward the open positions as indicated in the extreme by the dotted outline in FIG. 2. The operation of the clapper assembly 40 is controlled mainly by differential pressures thereacross but may be helped in some positions by gravity forces and the only limitation on mounting the present device is to be sure that the gravity force on the clapper is not directed so as to try to move it toward an open position. It should be noted that the present backflow preventer valve is designed mainly to prevent backflow of fluids from the downstream side thereof to the upstream side of the clapper so as to prevent contamination of or otherwise undesirably affect the upstream fluid source. This is very important to systems, such as sprinkler systems used in buildings and in other systems as well, because sprinkler systems may contain downstream water which remains immobile and stagnant for long periods of time, and this water could contaminate the main water supply if it were allowed to seep back through the valve. However, in such systems, it is also desirable to be able to open the backflow preventer valve, for example, in case of fire, so that fluid can flow to the downstream side of the valve. The present construction provides a safe, highly efficient, and relatively simple construction for accomplishing these purposes.

The construction and operation of the dual valve seats and adjacent space of the present construction are further illustrated in FIGS. 3 and 4. These characteristics, unique to the subject device, enable the clapper assembly 40 when operating properly and when closed, to provide two sealed closures against backflow leakage or siphonage. Under normal operating conditions, the two portions 42 and 44 of the clapper assembly 40 seat simultaneously around the concentric annular valve seats 70 and 72 to form the enclosed space 76. However, if one clapper member is prevented from seating properly by an obstruction or otherwise, the limited independent operation of the other clapper member will still provide proper seating to prevent backflow through the valve. FIG. 3 shows the clapper assembly 40 with the primary or inner clapper member 42 thereof in an open or partially open position and the secondary or outer clapper member 44 in a closed position. Since the outer clapper member 44 is properly seated against the valve seat 72, downstream fluid is prevented from flowing or seeping upstream through valve seat 72 and contaminating the main upstream fluid source. In the closed position, the space 76 is sealed from communication with the fluid downstream thereof at 80 by the cooperation of the valve seat 72 and the annular gasket or seal member 52. With the primary or inner clapper member 42 unseated at valve seat 70, the upstream fluid is allowed to flow through opening 88 into the annular space 76 and to drain to atmosphere through the discharge or pressure release orifice 82. This flow of upstream fluid out through orifice 82, as in the case of a downstream leak, will serve as an indication or warning that a malfunction has ocurred. Thus, if the inner clapper member 42 does not sealably engage the seat 70, the outer clapper member 44 will still be able to seat properly on its respective seat 72 and prevent contaminated fluid from seeping upstream into fluid source.

In like manner, FIG. 4 shows the clapper assembly 40 with the inner clapper member 42 in a fully closed and seated position and with the outer clapper member 44 in an open or partially open position. It can be seen that when the inner clapper member 42 is properly seated, the annular space 76 is sealed from communication with the upstream fluid at 78 by means of cooperation between the inner annular valve seat 70 and the flexible gasket 52. With the outer clapper member 44 unseated, the downstream or contaminated fluid will be allowed to seep into the intermediate space 76 by way of the opening 90 and will be vented to the atmosphere through the discharge port or orifice 82. Thus, if the outer clapper member 44 does not seat properly, the independent operation of the inner clapper member 42 will still be able to prevent the downstream fluid from flowing backwards through the valve. It should be noted that when proper seating of one of the two clapper members is partially obstructed by some foreign object or material, fluid will be able to flow continuously into space 76 and out through the open air discharge port 82 as long as the obstruction remains. The discharge of fluids through the orifice 82 as stated serves as an indication or warning of some malfunction.

The flexible gaskets 52 and 54 are shown having U-shaped flexible central portions 66 and 68 respectively which are able to bend or flex as shown in FIGS. 3 and 4 to enable the two portions 42 and 44 of the clapper assembly 40 to move relative to each other so that one portion may be sealed closed while the other is open or partially open. However, as long as either clapper member 42 and 44 sealably engages its associated valve seat, flow through the valve in both directions is prevented.

FIG. 5 shows a modified embodiment of the subject construction wherein the outer clapper member 44' is shown connected to one or more flange members 94 which have their opposite ends pivotally attached to modified housing structure 92. The pivot means 86' are formed by flange members 94 coupled to mounting flanges 95 on the housing 92 by means of a pin member 87A' that extends through mounting bracket means 87B'. The flange members 94 serve the same purpose as hinged arm member 84 (FIG. 2) and enable the clapper assembly 40' to move between its closed position shown in solid outline and its open position shown in dotted outline. In this construction, as above, the operation of the clapper assembly 40' is identical to that of the clapper assembly 40 of FIG. 2. In addition, a strainer member 96 is shown positioned upstream from the main clapper assembly 40' and includes a strainer portion 98 and a base portion 102. The strainer member 96 is designed to restrain foreign objects or obstructions, and particularly those objects that are larger than the mesh of the strainer, from flowing downstream and potentially lodging between the clapper portions 42' and 44' and the respective valve seats 70 and 72 thereby to disrupt the proper sealing action of the clapper assembly 40'. The strainer portion 98 may be constructed of a wire mesh or other suitable material having openings 100 uniformly distributed over the entire surface area thereof. Although the strainer portion 98 is shown as being hemispherical in shape, any shape can be used as long as it does not interfere with the normal fluid flow through the subject valve. As the upstream fluid flows through the strainer portion 98, foreign objects and debris which may potentially cause seating problems for the valve are collected and restrained from flowing downstream. The size of the mesh is determined by the size of the acceptable obstructions that can pass through. The size of the maximum possible obstruction also governs the minimum required size of the discharge port.

The strainer 96 is shown having the base portion 102 which is circular in shape and is used for mounting it on inlet portion 104 upstream of the clapper 40'. The base portion 102 may include threads or other suitable means for mounting it. In addition, an access panel 106 may be located on one side of housing structure 92 and should be of sufficient size and shape such that clapper 40' and the strainer 96 can be easily accessed for maintenance, service or replacement therethrough. The provision of the strainer member 96 is optional and in no way affects the basic operation of the subject valve.

Figure 6:
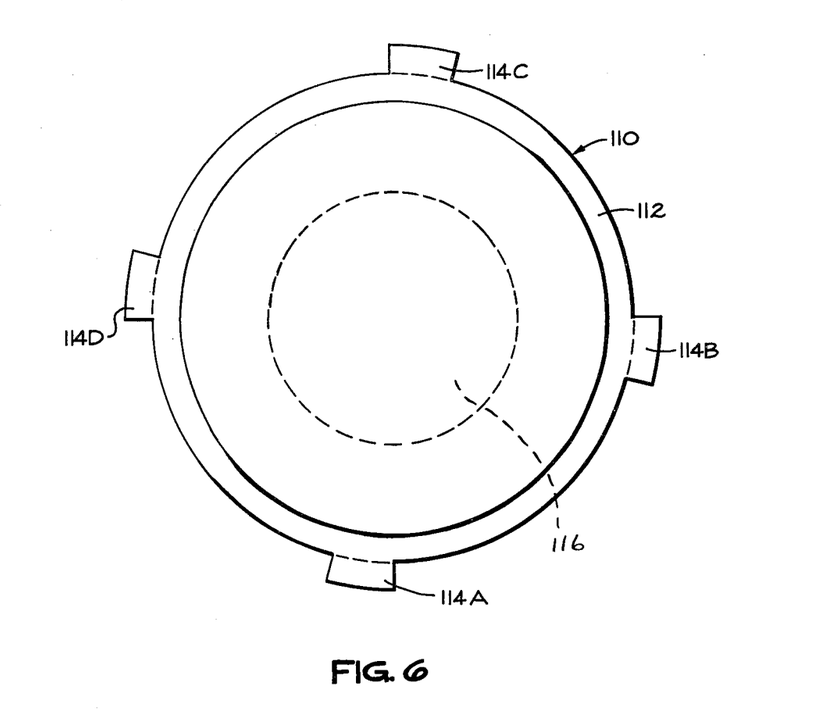
FIG. 6 is a top plan view showing a modified form of the inner clapper member.
Figure 7:
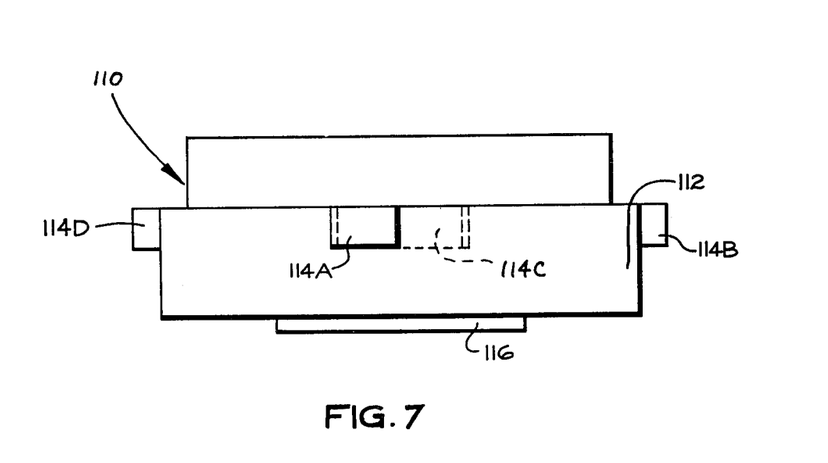
FIG. 7 is a side elevational view of the inner clapper member as shown in FIG. 6.
Figure 8:
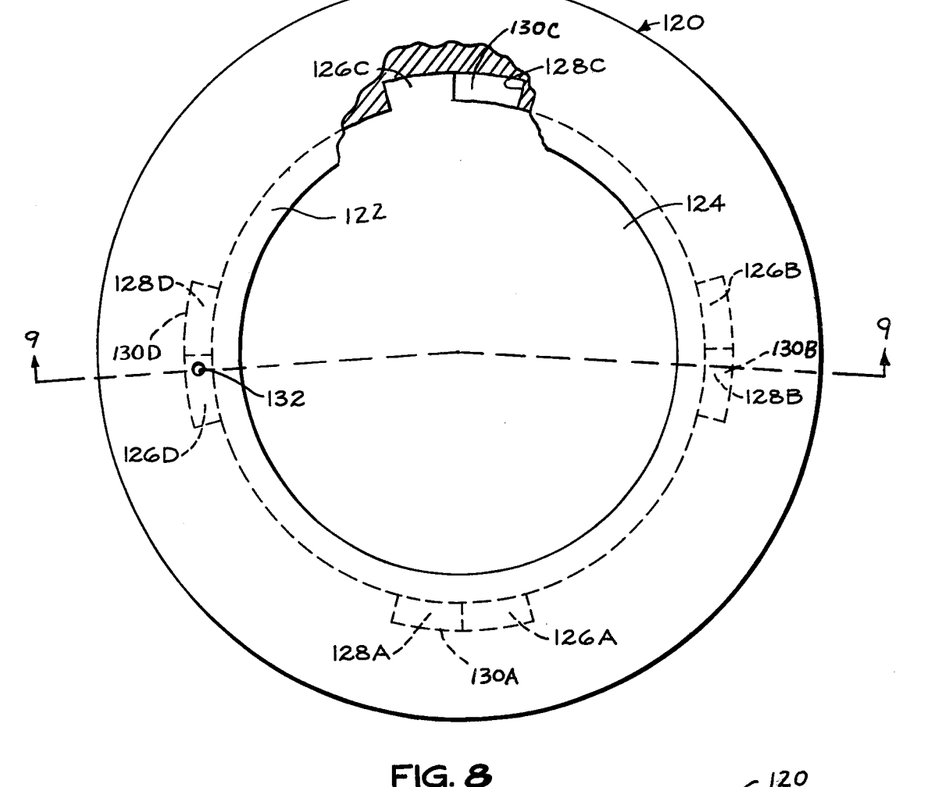
FIG. 8 is a top plan view, partly in cutaway, showing the outer clapper member that may be employed with the inner clapper member of FIGS. 6 and 7.
Figure 9:
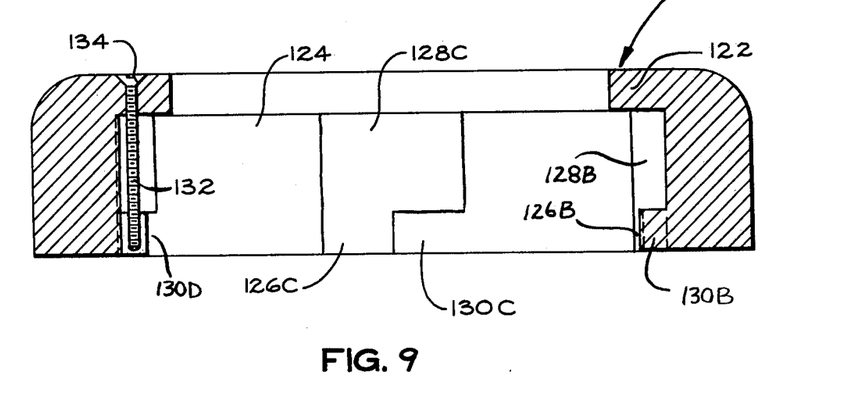
FIG. 9 is a cross-sectional view taken on the line 9—9 of FIG. 8.

The clapper assembly used in the subject valve may also optionally include cooperatively engageable interlocking means on the inner and outer clapper members to limit relative angular movement therebetween without otherwise affecting the operation. FIGS. 6 and 7 show a modified embodiment 110 of the inner clapper member, which embodiment is similar in overall structure and operation to the inner clapper member 42 as shown in FIG. 2. The modified inner clapper member 110 is shown as being round and has an outwardly extending annular flange 112 similar to flange 46 which extends therearound. The annular flange 112 has formed or attached thereto other flanges 114A–D which form male interlocking members on the inner clapper member 110. The flanges 114A–D cooperatively engage portions of outer clapper member 120 as shown in FIGS. 8 and 9 to limit the relative angular movement therebetween. In addition, a flexible gasket member similar to the member 52 in FIG. 2 is positioned against the flange 112 and extends around a locating projection 116 (FIG. 7). The projection 116 and the gasket 52 form a relatively smooth continuous surface on inner clapper member 110.

FIGS. 8 and 9 show the modified embodiment 120 of the outer clapper member, which member cooperatively engages with the inner clapper member 110 shown in FIGS. 6 and 7. The outer clapper member 120 is annular in shape and has an inwardly extending annular flange 122 similar to flange 48 of the construction shown in FIG. 2. The outer member 120 also has a central opening 124 which is constructed to receive and accommodate the outwardly extending flange 112 on the inner clapper member 110 when the members are properly assembled. The outer clapper member 120 has a plurality of spaced cavities or recesses 126A–D formed in the interior wall surrounding the central cavity 124, which cavities cooperatively receive respective male flanges 114A–D on the inner clapper member 110 (FIGS. 6 and 7). The cavities 126A–D extend from the surface of outer clapper member 120 opposite the flange 122 towards such flange as shown in FIG. 9 and communicate with the circumferentially longer cavity portions 128A–D. This means that the clapper portions 110 and 112 are assembled by registering the flange portions 114A–D with the cavities 126A–D and moving the members together while rotating the members after the portions 114A–D clear the cavities 126A–D so that the flange portions 114A–D will move behind land portions 130A–D on the member 120 and thereafter prevent the members from coming apart by relative axial movement therebetween. With the members 114A–D positioned as aforesaid an optional post or rod member 132 as shown in both FIGS. 8 and 9 is positioned in a hole in member 120 to prevent relative rotational movement between the clapper members 110 and 120 at a time when they are interlocked. The post member 132 may be a threaded member, if desired for some reason, and may be countersunk as shown at 134 to provide a smooth outer surface for the clapper member 120. In a further optional arrangement (not shown) for preventing rotational movement between the clapper members 110 and 120, the hole through the member 120 may be positioned to extend from the outer surface thereof to communicate with a cavity such as cavity 128D and a further hole may be included in a male flange member such as member 114D of the clapper member 110 and positioned therein to be aligned with the hole in clapper member 120 when the clapper members are placed in interlocking engagement with male flange member 114D positioned in cavity 128D. Since the clapper members 110 and 120 will also be connected by means of the flexible valve members such as the members 52 and 54 in FIG. 2, the additional protection provided by means of one or more posts such as the post 132 may be helpful to prevent damage to or strain on the flexible members. Also, the hole through the member 120 to accommodate the post 132 should be somewhat oversized to permit relatively free axial movement between the members 110 and 120. Although FIGS. 6–9 show four mae and female interlocking connections between the clapper members, it is recognized that any number of such may be provided as desired.

Figure 10:
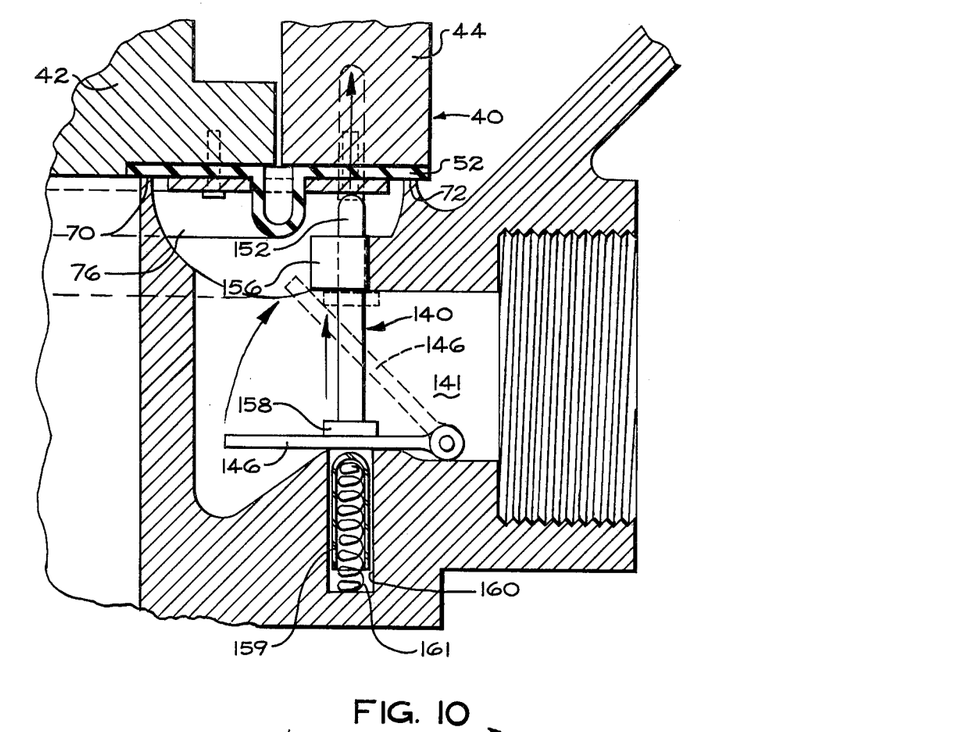
FIG. 10 is an enlarged fragmentary cross-sectional view taken of an alternate embodiment having valve means associated with the space formed between the valve seats and a discharge port associated therewith; and, FIG. 11 shows a modified form of valve means associated with the outlet port to the space formed between the valve seats in the subject device.

FIG. 10 shows an optional discharge valve assembly 140 located in an outlet passage 141 that communicates with annular space 76 formed by and between the valve seats 70 and 72. The passage 141 is provided instead of the discharge orifice 82 and is likewise located adjacent to the bottom of the valve housing similar to the position of orifice 82 shown in FIGS. 3-5. The passage 141 has its opposite end at atmospheric pressure, and may be threaded so that conduits may be easily attached thereto for directing the flow of escaping fluids to other parts of the system or to a drain. The discharge valve assembly 140 includes a hinged valve plate 146 which abuts on one side a rod 152 which is slideably positioned in an opening in a housing portion 156. The rod 152 has an enlarged portion 158 on one end which bears against the valve plate 146, and the opposite end of the rod 152 bears against the outer clapper member 44 to maintain pressure on the valve plate 146 to keep the passage 141 open when the backflow preventer valve is closed. In this position, the annular space 76 between the valve seats 70 and 72 communicates with atmospheric conditions the same as with the orifice 82 described above. In this position the valve plate 146 also bears against a spring biased plunger 159 which is mounted in a counterbore 160 in the valve housing structure. A spring 161 is positioned in the counterbore 160 to urge the plunger 159 against the plate 146 in a direction to close the valve plate 146 when the clapper assembly 40 moves to its open position. This prevents the undesirable escape of fluids when the main valve is open. As the main clapper assembly 40 moves to its open position away from the valve seats 70 and 72, the spring biased plunger 149 will move the plate 146 toward its closed position as shown in dotted outline in FIG. 10. Thus, when the main clapper assembly opens the valve 140 will close and vice versa. This optional valve construction will prevent undesirable loss of fluid during periods when the backflow preventer valve is open.

Figure 11:
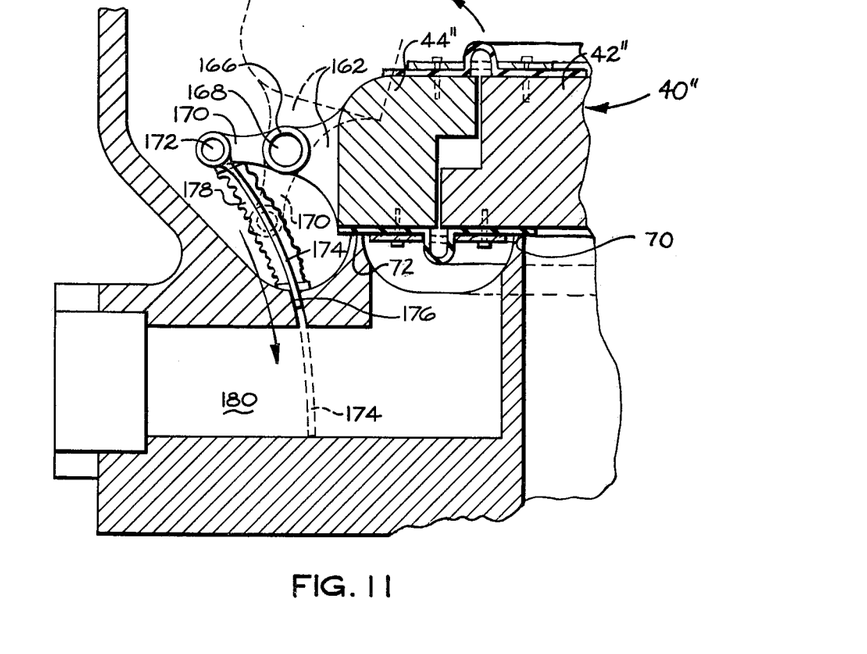

FIG. 11 shows another modified embodiment of a valve assembly for controlling flow of fluid out from the spaced formed between the valve seats 70 and 72. In this case the outlet port is located on the hinge side of the clapper assembly rather than on the opposite side thereof. The clapper assembly 40" is modified to have one or more flanges 162 formed or attached to the outer clapper member 44" and the flanges have bore portions 166 which receive hinge pin 168 which also cooperates with mounting brackets in the housing structure (not shown). The flanges 162 also have other extensions 170 which are located on the opposite side of the bore portions 166 from the clapper assembly 40". The extensions 170 are pivotally connected at 172 to a curved valve plate 174 which extends through a slightly oversized opening 176 in the housing. The curved plate 174 is also enclosed in a flexible bellows device 178 which makes sealed engagement with the structure around the plate 174 to prevent leakage from the downstream side of the main valve to the outlet port 180 which is at atmospheric conditions. When the clapper assembly 40" is in closed position, the flanges 162 and 170 are in the positions shown in solid outline in FIG. 11 and the valve plate 174 is moved or pulled upwardly to its open position as shown allowing communication to atmosphere of the space between the valve seats 70 and 72. However, when the clapper assembly 40" moves to its open position the flanges 162 and 170 pivot about pivot shaft 168 thereby moving the plate 174 downwardly and across the passage 180 to close the passage. The plate 174 may also be allowed to move completely across the passageway 180 into a groove formed on the opposite side thereof, if desired, to further assure complete closure.

As explained above, the use of a discharge orifice to atmosphere is a novel feature which has certain advantages. These advantages reside in providing means for fluid that leaks into the space between the two main valve seats to escape without buildup of pressure therein. This is especially important if one of the valve seats not be fully engaged and sealed closed by the flexible member on the clapper assembly. This can occur if a particle or other debris should lodge between the members or if the valve seats or seating member should be damaged for some reason. This special discharge passage coupled with a backflow preventer valve having two spaced valve seats engageable respectively by relatively movable portions of a two element clapper assembly constitutes an important advance in the art for the reasons already stated.

Thus, there has been shown and described a novel backflow preventer valve which fulfills all of the objects and advantages sought therefor. Many changes, modifications, variations, and other uses and applications of the present valve construction will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A backflow preventer valve comprising a housing structure having top and bottom portions and a chamber formed therein with inlet and outlet ports, a pair of spaced valve seats associated with one of said ports including means on said housing structure forming a space between said valve seats, a movable valve assembly hingedly attached to said housing structure for movement in said chamber between a closed position adjacent to said valve seats and an open position angularly related to said closed position, said valve assembly having a clapper portion defined by inner and outer members, a flexible valve seat member and first and second members for attaching the flexible valve seat member respectively to said inner and outer relatively movable clapper members, said flexible valve seat member having a first portion positioned to be engageable with said first valve seat in the closed position thereof and a second portion positioned to be engageable with said second valve seat in the closed position thereof, and a discharge port in the housing structure communicating the space formed in said housing structure between the spaced valve seats with atmosphere, said discharge port being located adjacent to the bottom of said housing structure in position to drain fluid from between the spaced valve seats and the movable valve assembly when said valve assembly is in its closed position to maintain an airspace therebetween.

2. The backflow preventer valve defined in claim 1 wherein said inner and outer clapper members are concentrically located with respect to each other and include cooperatively engageable means respectively on said inner and outer clapper members to limit relative movement therebetween.

3. The backflow preventer valve defined in claim 1 wherein said inner and outer clapper members within limits are independently movable relative to each other to engage their respective valve seats.

4. The backflow preventer valve defined in claim 1 wherein the space formed in the housing structure is maintained at ambient air pressure when said valve assembly is in its fully closed position.

5. The backflow preventer valve defined in claim 1 including auxiliary valve means associated with the discharge port to control communication therethrough, said auxiliary valve means including control means operatively engageable with said movable valve assembly to control the opening and closing thereof.

6. The backflow preventer valve defined in claim 5 wherein said control means include means movable to a first position in response to movement of the movable valve assembly to an open position to close the auxiliary valve means and to a second position opening the auxiliary valve means when the movable valve assembly moves to a closed position.

7. The backflow preventer valve defined in claim 5 wherein said control means includes a member operatively engageable by the clapper portion.

8. The backflow preventer valve defined in claim 1 wherein said housing structure includes an access panel large enough for the clapper portion to pass therethrough.

9. The backflow preventer valve defined in claim 1 wherein said first and second members for attaching said flexible valve seat member respectively to said inner and outer relatively movable clapper members includes a pair of spaced ring members and means for attaching said ring members to the respective inner and outer clapper members.

10. The backflow preventer valve of claim 1 including a strainer member for predetermined mesh mounted in the inlet port upstream of the pair of spaced valve seats.

11. A backflow preventer value comprising a housing structure having top and bottom portions and a chamber formed therein with inlet and outlet ports for attaching to system conduits, a pair of spaced valve seats associated with one of said ports and a groove formed in the housing structure between the valve seats, a movable clapper assembly having inner and outer relatively movable members and pivot means attached to one of said members for pivotally attaching the clapper assembly to said housing structure for movement in said chamber between a closed position adjacent to said valve seats and an open position angularly related to said closed position, a flexible valve seat member mounted on the clapper assembly including first and second members for respectively attaching said flexible valve seat member to said inner and outer relatively movable clapper members, said flexible valve seat member having a first portion engageable with one of said pair of spaced valve seats and a second portion engageable with the other of said spaced valve seats, the housing groove and the flexible valve seat member forming a substantially closed space therebetween when the clapper assembly is in its closed position, a discharge port communicating the closed space to atmosphere, said discharge port being located in the housing structure adjacent to the bottom thereof in position to drain fluid from between the spaced valve seats and the clapper assembly when said clapper assembly is in its closed position to maintain an airspace therebetween, and other valve means under control of said clapper assembly to close the discharge port when the clapper assembly is in the open position.

12. The backflow preventer valve defined in claim 11 wherein said inner and outer clapper members are concentrically located with respect to each other, and including respective cooperation means on said inner and outer members to limit relative movement therebetween whereby said members are able to independently operatively engage the respective ones of said pair of spaced valve seats.

13. The backflow preventer valve defined in claim 11 wherein said closed space is maintained at ambient pressure only when said clapper assembly is in its closed position.

14. The backflow preventer valve defined in claim 11 wherein said inner and outer clapper members include cooperatively engageable interlocking means to limit relative movement therebetween.

15. The backflow preventer valve defined in claim 11 wherein said other valve means include a valve operator member engageable by the clapper assembly in the closed position thereof.

16. The backflow preventer valve defined in claim 11 wherein said other valve means include a valve plate member operatively engageable by the clapper assembly.

17. The backflow preventer valve defined in claim 11 wherein a strainer member is cooperatively engageable with said inlet port to limit the size of particles that can pass therethrough.

18. A backflow preventer valve comprising a housing structure having upper and lower portions and a chamber formed therein communicating with inlet and outlet ports, a pair of second concentrically located valve seats associated with the inlet port, a movable valve assembly including pivot means hingedly attaching said movable valve assembly to said housing structure for movement in said chamber between a closed position adjacent to said valve seats and an open position angularly related to said closed position, a groove formed in the housing structure in the space between said spaced valve seats, said movable valve assembly having cooperatively engageable relatively movable interlocking inner and outer portions, a flexible valve seat member having a first portion attached to the inner portion of the valve assembly and a second portion attached to said outer portion, said first portion being positioned on the movable valve assembly to engage one of said pair of spaced valve seats in the closed position thereof and said second portion being positioned on the movable valve assembly to engage the other of said pair of spaced valve seats in the closed position thereof, and a discharge port located adjacent to the lower portion of said housing structure communicating the groove formed between said spaced valve seats with atmospheric conditions, said discharge port being positioned to drain fluid from between the spaced valve seats and the valve assembly when said valve assembly is in its closed position to maintain an airspace therebetween.

19. The backflow preventer valve defined in claim 18 wherein said inner and outer portions are concentrically located with respect to each other, said inner portion being round and having an outwardly extending annular flange extending therearound, said outer portion being annular in shape and having an inwardly extending annular flange for cooperatively engaging the outwardly extending flange on the inner member to limit relative axial movement therebetween.

20. The backflow preventer valve defined in claim 19 including cooperatively engageable interlocking means on said inner and outer portions to further limit relative rotational movement therebetween.

21. The backflow preventer valve defined in claim 18 wherein the pair of spaced valve seats are radially oriented relative to each other.

22. The backflow preventer valve defined in claim 18 wherein the area of the movable valve assembly exposed to fluid pressure on the side thereof associated with the inlet port when the valve is closed is substantially less than the area of the movable valve assembly exposed to the pressure on the opposite side thereof.

23. A backflow preventer valve comprising a housing structure having inlet and outlet ports therethrough for attaching to system conduits, said housing structure having top and bottom portions and a chamber formed therein communicating with the inlet and outlet ports, a pair of spaced valve seats associated with said inlet port, a continuous groove formed in the housing structure between said spaced valve seats, a movable valve assembly and means hingedly attaching the movable valve assembly to said housing structure for movement in said chamber between a closed position adjacent to said valve seats and an open position angularly related to the closed position, said movable valve assembly including a central portion and a peripheral portion defining a space therebetween to enable limited axial and radial movement therebetween, a first flexible valve seat member having first and second connected portions and means for respectively attaching said portions to the central and to the peripheral portions on one side thereof whereby the flexible valve seat member extends across the space between the central and peripheral portions on said one side of the valve assembly, the first portion of the flexible valve seat member being positioned to engage one of said pair of valve seats when the valve assembly is in the closed position and said second portion being positioned to engage the other of said pair of valve seats in said closed position thereof, a discharge port positioned adjacent to the bottom portion of the housing structure communicating the groove formed between the spaced valve seats with atmospheric conditions to drain fluid from between said valve seats and the valve assembly when the valve assembly is in the closed position to maintain an airspace therebetween, and a second flexible valve seat member similar to the first valve seat member including means respectively connecting said second valve seat member to the central and to the peripheral portions of the valve assembly across the space therebetween but on the opposite side of the valve assembly from the first valve seat member, said first and second flexible valve seat members having a respective flexible sidewardly extending connection portion forming a space along and bridging the space between the central and peripheral portions of the movable valve assembly on respective opposite sides thereof to permit limited relative movement therebetween without stretching the valve seat members.

24. The backflow preventer valve defined in claim 23 wherein said discharge port includes auxiliary valve means associated therewith to control communication therethrough, said auxiliary valve means including control means operatively engageable with said movable valve assembly to control the opening and closing thereof.

25. The backflow preventer valve defined in claim 24 wherein said control means include means movable to a first position in response to movement of the movable valve assembly to a closed position to open the auxiliary valve means and to a second position closing the auxiliary valve means when the movable valve assembly moves to an open position.

26. A backflow preventer valve comprising a housing structure having a chamber formed therein and communicating inlet and outlet ports, a pair of spaced concentrically located valve seats associated with the inlet port, a movable valve assembly including pivot means hingedly attaching said movable valve assembly to said housing structure for movement in said chamber between a closed position adjacent to said valve seats and an open position angularly related to said closed position, a groove formed in the housing structure in the space between said spaced valve seats, said movable valve assembly having cooperatively engageable relatively movable interlocking inner and outer portions, a flexible valve seat member having a first portion attached to the inner portion of the valve assembly and a second portion attached to said outer portion, said first portion being positioned on the movable valve assembly to engage one of said pair of spaced valve seats in the closed position thereof and said second portion being positioned on the movable valve assembly to engage the other of said pair of spaced valve seats in the closed position thereof, and a discharge port communicating the groove formed between said spaced valve seats with atmospheric conditions, said inner and outer portions of the valve assembly being concentrically located with respect to each other, said inner portion being round and having an outwardly extending annular flange extending therearound, said outer portion being annular in shape and having an inwardly extending annular flange for cooperatively engaging the outwardly extending flange on the inner member to limit relative axial movement therebetween, said valve assembly including cooperatively engageable interlocking means on said inner and outer portions to further limit relative rotational movement therebetween.

* * * * *

UNITED STATES PATENT OFFICE
CERTIFICATE OF CORRECTION

Patent No. 4,321,942  Dated  March 30, 1982

Inventor(s) Daniel C. Duggan

It is certified that error appears in the above-identified patent and that said Letters Patent are hereby corrected as shown below:

Column 3, line 66, "suitable" should be ---similar---.

Column 8, line 41, "mae" should be ---male---.

Column 11, line 11, "for" should be ---of---.

Column 12, line 10, "second" should be ---spaced---.

Signed and Sealed this

Eighth Day of June 1982

|SEAL|

Attest:

GERALD J. MOSSINGHOFF

Attesting Officer   Commissioner of Patents and Trademarks